June 6, 1967  T. F. HELMS  3,323,351

MACHINE FOR TESTING CAN TOPS

Filed Oct. 15, 1965  4 Sheets-Sheet 1

INVENTOR.
THOMAS F. HELMS
BY
Robertson, Smythe, Bryan & Parmelee
ATTORNEYS.

INVENTOR.
THOMAS F. HELMS

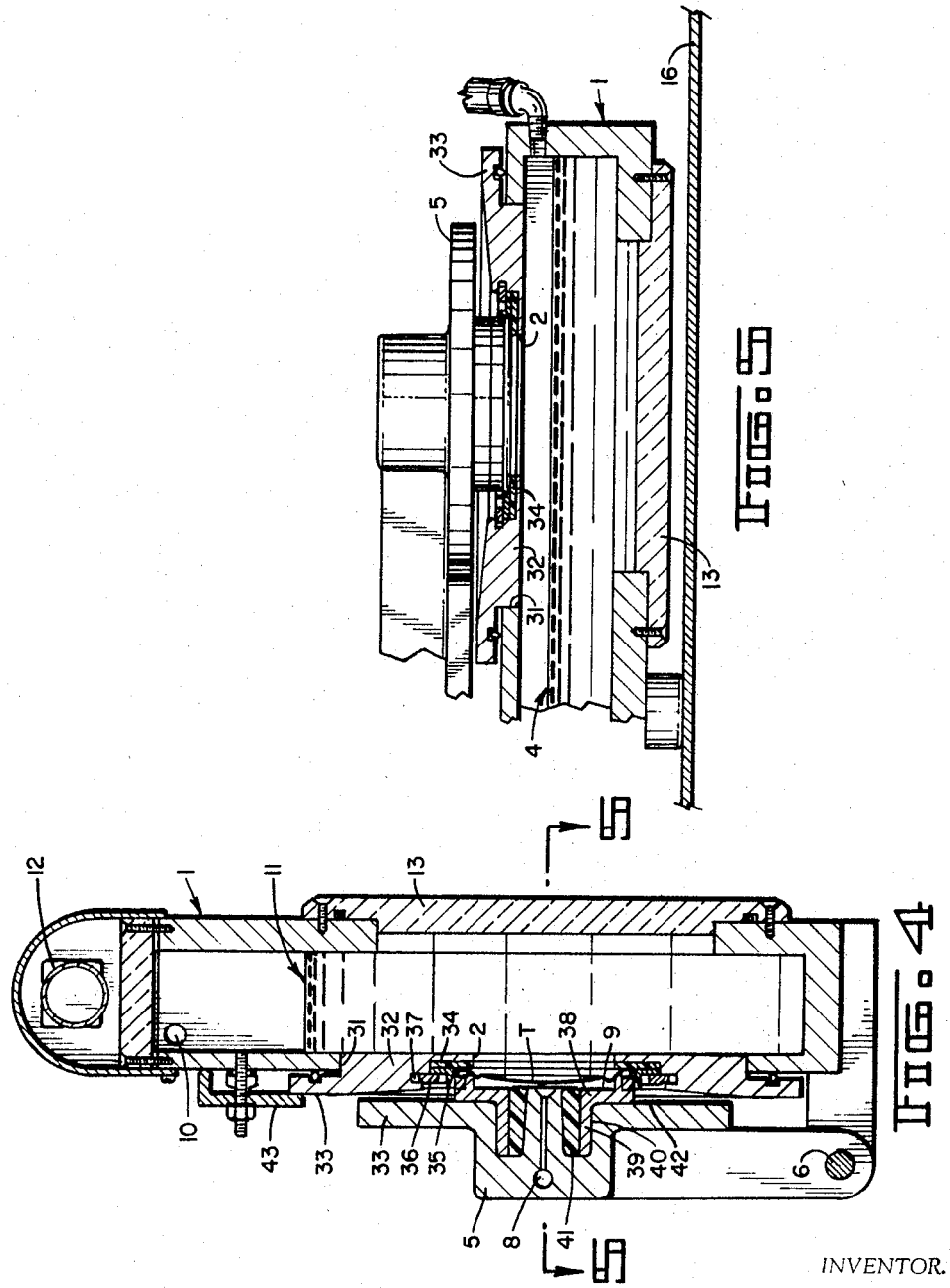

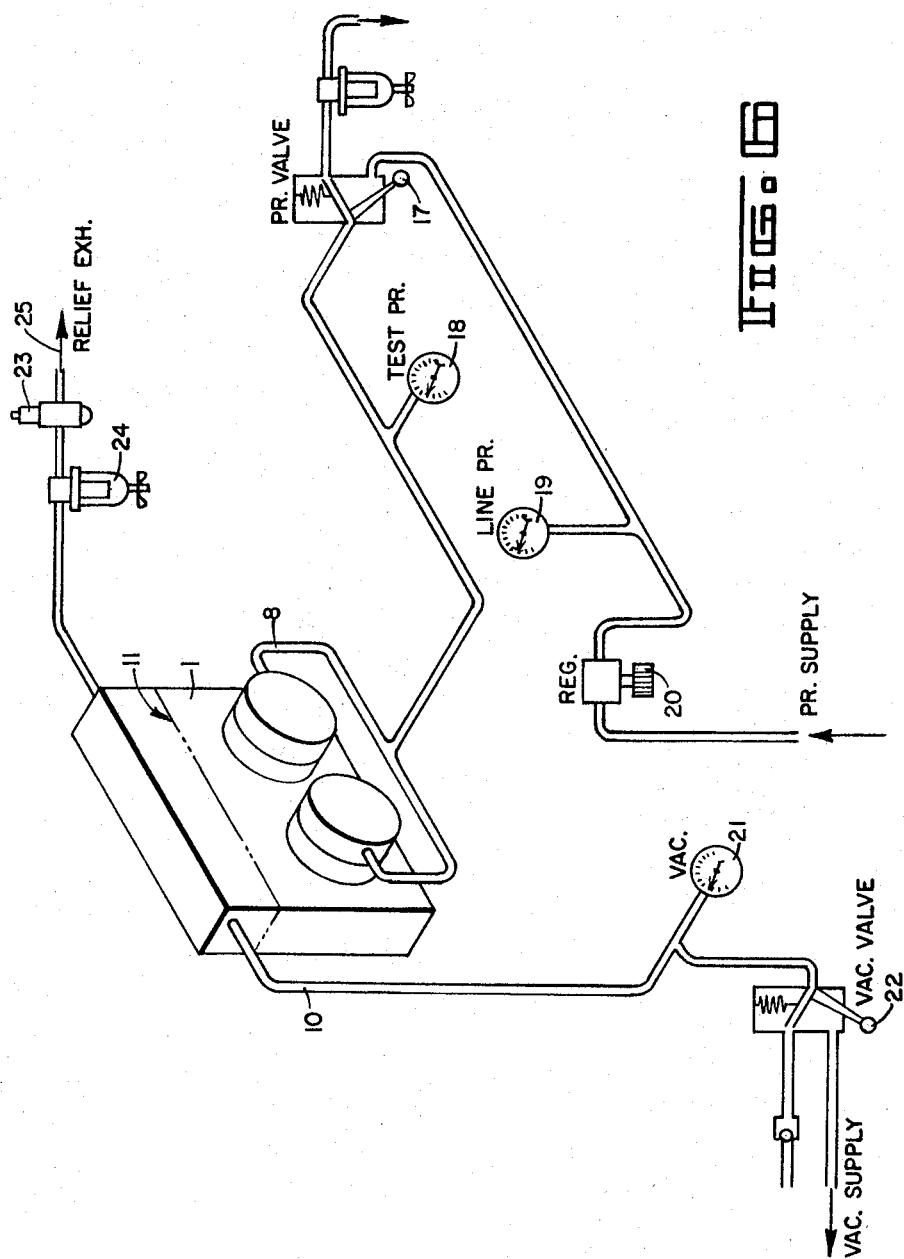

United States Patent Office 3,323,351
Patented June 6, 1967

3,323,351
MACHINE FOR TESTING CAN TOPS
Thomas F. Helms, New Fairfield, Conn., assignor to Country Engineering Inc., Danbury, Conn., a corporation of Connecticut
Filed Oct. 15, 1965, Ser. No. 496,569
6 Claims. (73—45.5)

The invention relates to apparatus for determining the pressure tightness or leak-proof quality of can tops. It has particular application to the testing of "easy opening" can ends such as those having tear tabs or strips which can be pulled free to create pouring openings or to sever the end for removal from the can body. Such tear tabs are used for example in metal beer cans, and the tear strips are used for coffee cans and the like.

Because such tabs and strips are formed by scoring or otherwise weakening the metal along predetermined tear lines, there is a problem in obtaining just the right amount of weakening at the tear lines to make it easy to open the cans while avoiding the possibility of creating leaks through which pressure tightness would be lost or which could result in the contents of the can seeping out before the can is opened for use. The present invention provides means for testing the can tops for pressure tightness (bursting pressure), and for leakage, before application of the tops of the cans.

Summary

According to my invention a tank having an opening in its side is provided with means for clamping a can top or other article to be tested in a position covering such opening. The tank is pivotally mounted to be swung into alternate positions. In one position the tank lies horizontally and the opening is disposed above the level of the liquid in the tank, permitting application and removal of the article to be tested. In the other position the tank is upright so that the liquid covers one side of the article to be tested. Means are provided for creating a pressure differential between the outside of the tank in the region of the article to be tested and the inside of the tank above the liquid contained therein. Means such as a window in the side of the tank opposite the test opening affords the test operator a view of the submerged side of the article he is testing. Bursting or rupture of the tear tab is observed through the window and any leakage is revealed by bubbles ascending from the region of the article tested upon creation of the aforesaid pressure differential. Bursting pressure is created by feeding air or gas under pressure into a closed chamber adjacent the tank and opposite the test opening, the article to be tested forming one side of such closed chamber. Leakage pressure is created by a suction line connected to the tank at a point which is above the surface of the liquid contained therein when the tank is in its upright position. A light source may be arranged in a position to project light into the liquid to increase visibility of the ascendng bubbles or to reveal more clearly the absence of such bubbles.

Description

In the accompanying drawings I have illustrated the best mode contemplated by me for carrying out my invention.

FIG. 4 is a vertical transverse sectional view taken on line 4—4 of FIG. 3.

FIG. 5 is a detail cross sectional view taken on line 5—5 of FIG. 4, depicting a portion of the tank and associated structure in the position shown in FIG. 2.

FIG. 6 is a diagram of the pressure and vacuum systems.

Figure 1:
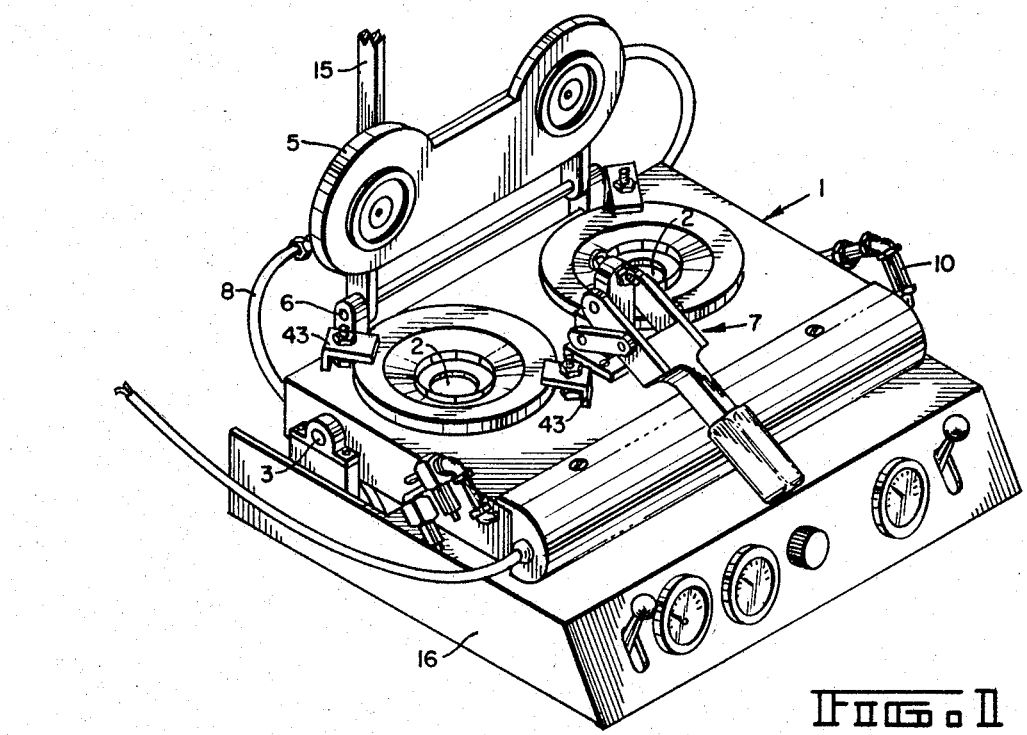
FIG. 1 is an isometric perspective view of a selected form of my apparatus, the parts being shown in the position for receiving the articles to be tested.
Figure 3:
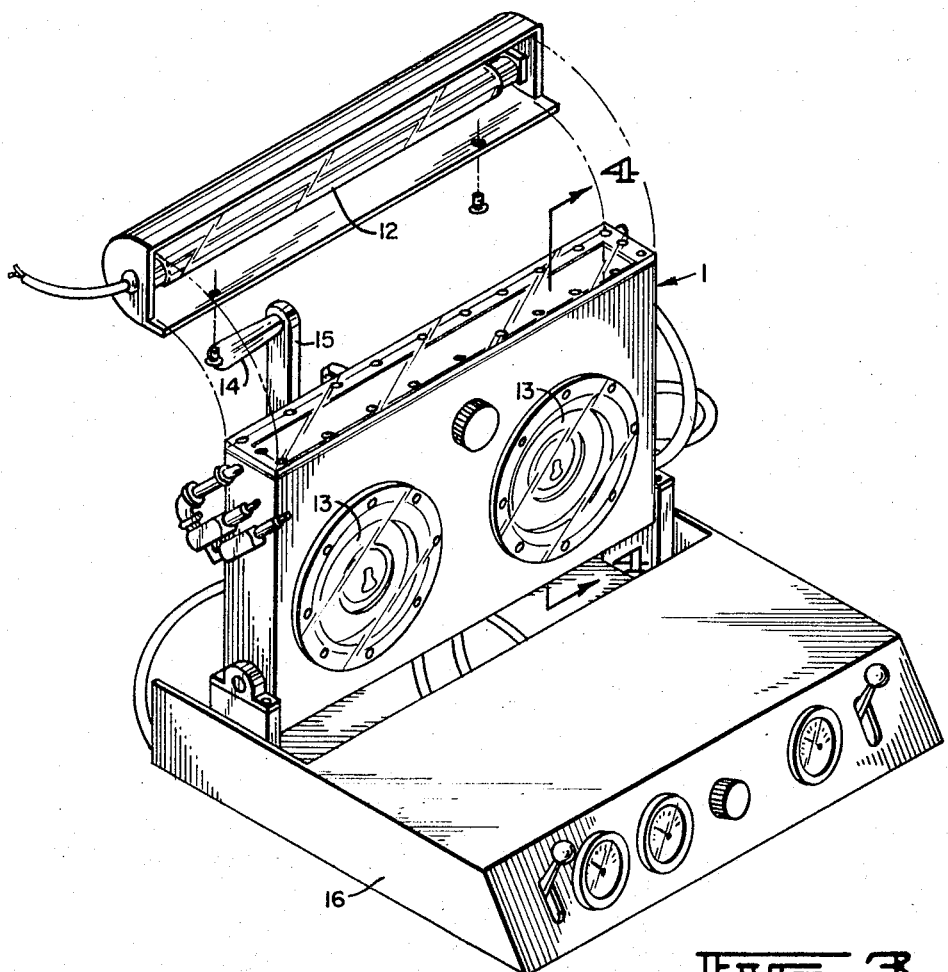
FIG. 3 is a similar view with the test tank raised into its vertical position.

Referring to FIGS. 1 and 4, my apparatus in its general arrangement comprises a tank 1 having an opening or openings 2 and means for clamping an article T to be tested in a position covering such opening. The tank is pivotally mounted as at 3 to a suitable base so it can be swung into alternate positions including a horizontal position, FIGS. 1 and 5, in which the opening 2 lies above the liquid level 4 to permit the application and removal of articles to be tested, and a vertical position. FIGS. 3 and 4, in which the liquid covers one side of the article T. Means are provided for creating a pressure differential between the outside of the tank in the region of the article to be tested and the inside of the tank in the region above the liquid contained therein. And means such as a window or windows 13 associated with the tank allow the test operator to see bubbles (or the absence of bubbles) ascending from the region of the article T upon creation of the aforesaid pressure differential.

In the preferred construction illustrated, the means for clamping the article T includes a member 5 pivotally mounted on the side of tank 1 as at 6, and means such as the toggle clamp 7 for holding member 5 in its clamping relation to the tank. The means for creating a pressure differential between the outside and inside of the tank comprises a source of compressed air 8 leading to an enclosed chamber 9 outside the tank in the region of the article to be tested. Another means for creating a pressure differential comprises a suction line 10 connected to the tank 1 at a point which is above the surface 11 of the liquid contained therein when the tank is in the position in which the liquid covers the article T to be tested. (See FIG. 4.) A light source 12 is arranged to project light into the liquid in the tank to make visible the ascending bubbles. A handle 14 fixed to an arm 15 attached to the pressure plate or clamping member 5 is used in moving the pressure plate between its FIG. 1 and FIG. 2 positions, and is used also in swinging the entire tank assembly between its FIG. 3 and FIG. 4 positions.

Figure 2:
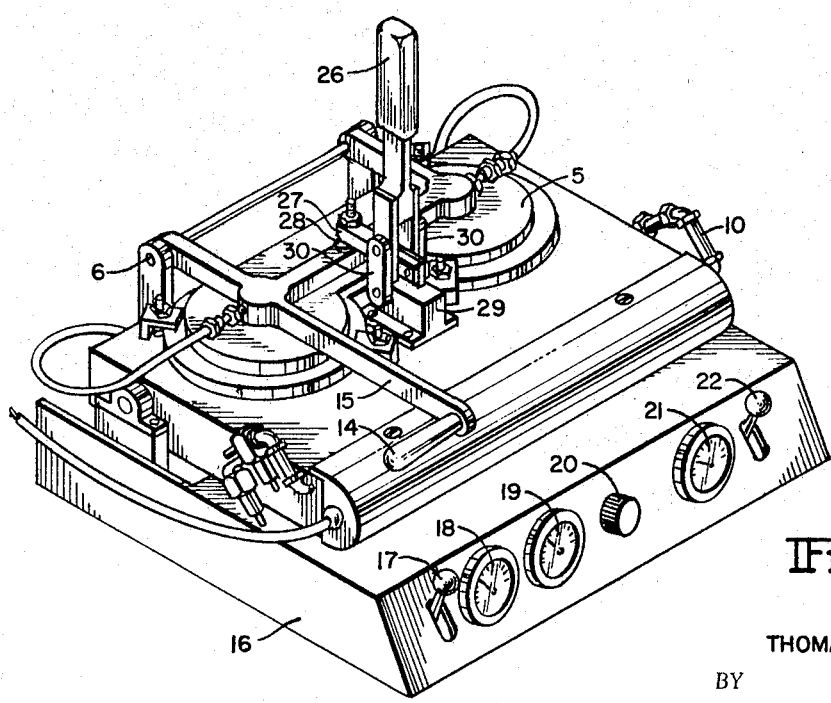
FIG. 2 is a similar view with the parts in article-clamping position.

The pressure and vacuum systems are shown schematically in FIG. 6. The fluid conduits may advantageously consist of flexible pressure hoses which extend within the base 16 of the apparatus so that the several pressure and vacuum gauges and valves can be arranged on a control panel at the front of the assembly as seen in FIGS. 1–3. These comprise, reading from left to right in FIG. 2, a pressure valve 17, test pressure gauge 18, line pressure gauge 19, regulator valve 20, vacuum gauge 21 and vacuum valve 22. (Notice that these read instead from right to left in FIG. 6 due to the fact that here we are looking at the back of the tank to reveal the connections.) A pressure relief valve 23 takes care of excess pressure in the event of a violent leaker when a can top T bursts under test causing pressure to build up in the tank. This valve may have a filter 24 to remove most of the entrained water before it is blown violently out of the valve at 25. Water collected in the filter bowl is removed by depressing the small valve at the bottom of the bowl.

The toggle clamp 7 for holding the pressure plate in article-clamping position may be of any well known construction such as one comprising a locking handle 26, FIG. 2, pivoted to clamping bar 27 having an adjustable pad 28 adapted to engage a projection on the back of pressure plate 5 in the locked position shown in this view. Clamping bar 27 is pivoted to a lug 29 fastened to tank 1, and handle 26 is pivotally joined to this same lug by a pair of toggle links 30. The unlocked position is shown in FIG. 1.

My improved test apparatus includes means for adapting it to receive articles of different sizes and form. For this purpose the tank 1 is provided with an enlarged opening 31, FIGS. 4 and 5, to receive an inner adapter body 32 having a peripheral flange 33 grooved to receive an O-ring seal as shown. A series of such adapter bodies may be provided, each having openings 2 of a particular size and form to be used alternatively according to the size and form of the particular article to be tested. The particular adapter body 32 shown is recessed to receive an inner gasket 34 against which seats the rim of can top T that is to be tested. A locating ring 35 has a coniform inner surface furnishing a guide for seating can top T when it is dropped into place on gasket 34. Gasket 34 and ring 35 are held in place by a split retaining ring 36 which snaps into an undercut groove 37 in the opening of the adapter ring.

An outer adapter body 38 has a sleeve 39 received within an annular recess 40 in pressure plate 5. A tubular gasket 41 furnishes a seal between the pressure plate and outer adapter body. The adapter body 38 has a peripheral groove for gasket 42 which gives a pressure-tight seal around the edge of top T so that when the pressure plate is locked in test position the top T is held between gaskets 34 and 42. A series of such outer adapter bodies 38 may be provided to mate with selected inner adapter bodies 32 so that articles of the desired size and form can be received for testing.

After selection of the desired set of inner and outer adapter bodies, the inner adapter is fastened to the tank as by means of suitable clamps 43, and the outer adapter is seated firmly into recess 40 of the pressure plate. The apparatus is now ready to use. With the pressure plate raised as in FIG. 1, the can tops are dropped into place in the lower adapter rings. Handle 14 is swung down into the FIG. 2 position, closing the pressure plate against the can tops where it is then locked by raising toggle handle 26 as shown.

Next the operating handle 14 is raised to bring the tank 1 into the vertical position shown in FIGS. 2 and 4, so that the liquid in the tank covers one side of the can tops T and the operator can see the tops through the windows 13. Now the operator adjusts regulator valve 20 to the desired pressure to test the tops for bursting, observing this pressure as indicated by line pressure gauge 19. Next he operates pressure test valve 17, observing test pressure as indicated by gauge 18. Following this the operator releases valve 17 and operates vacuum test valve 22 to test the tops for leakage. At this point he looks for any signs of constant bubbling. This concludes the test procedures, the tank is swung back to its horizontal position, the pressure plate is unlocked and raised and the can tops removed.

The terms and expressions which I have employed are used in a descriptive and not a limiting sense, and I have no intention of excluding equivalents of the invention described and claimed.

I claim:

1. Test apparatus for determining the pressure tightness of can tops and the like which comprises a tank adapted to hold liquid, said tank having at least one opening therein and means for clamping an article to be tested in a position covering said opening, said tank being pivotally mounted to be swung into alternate positions including a horizontal position in which the opening therein lies above the liquid level to permit the application and removal of articles to be tested, and a vertical position in which the liquid covers one side of the article to be tested, means for creating a pressure differential between the outside of the tank in the region of the article to be tested and the inside of the tank in the region above the liquid contained therein and means associated with the tank for viewing bubbles (or the absence of bubbles) ascending from the region of the article to be tested upon creation of the aforesaid pressure differential.

2. Test apparatus according to claim 1 in which said means for creating a pressure differential comprises a source of compressed air or gas leading to an enclosed chamber outside the tank in the region of the article to be tested.

3. Test apparatus according to claim 1 in which said means for creating a pressure differential comprises a suction line connected to the tank at a point which is above the surface of the liquid contained therein when the tank is in the position in which the liquid covers the article to be tested.

4. Test apparatus according to claim 1 in which said means for creating a pressure differential comprises means for applying pressure at the outside of the article to be tested and alternate means for creating a partial vacuum above the surface of the liquid in the tank.

5. Test apparatus according to claim 1 in which said clamping means includes a member pivotally mounted on the side of the tank and means for holding said member in clamping relation to the tank.

6. Test apparatus according to claim 1 which includes a light source arranged to project light into the liquid in the tank to make visible the ascending bubbles.

References Cited

UNITED STATES PATENTS

| 1,589,825 | 6/1926 | Staebler | 73—46 |
| 3,131,638 | 5/1964 | Wilson et al. | 73—40 X |

LOUIS R. PRINCE, *Primary Examiner.*

J. NOLTON, *Assistant Examiner.*